United States Patent
Tseng

[19]

[11] Patent Number: 6,045,289
[45] Date of Patent: Apr. 4, 2000

[54] HIDDEN SCREW-PRESSING STRUCTURE FOR A PIPE CONNECTOR

[76] Inventor: Shao-Chien Tseng, No. 130 Sec 2. Yang-Shin Rd., Yang-Mei Taoyuan 326, Taiwan

[21] Appl. No.: 09/116,307

[22] Filed: Jul. 15, 1998

[51] Int. Cl.[7] .................................................. F16B 2/14
[52] U.S. Cl. ........................ 403/205; 403/370; 403/371
[58] Field of Search ..................................... 403/205, 110, 403/373, 374.1, 374.2, 374.3, 374.4, 367, 368, 370, 371; 285/421, 215, 389

[56] References Cited

U.S. PATENT DOCUMENTS

| | | | |
|---|---|---|---|
| 1,710,416 | 4/1929 | Goeller | 403/370 X |
| 1,854,783 | 4/1932 | Cook | 403/371 X |
| 3,112,116 | 11/1963 | Seitz | 403/370 X |
| 3,220,743 | 11/1965 | Knapp | 403/368 X |
| 3,284,114 | 11/1966 | McCord, Jr. et al. | 403/370 |
| 3,653,691 | 4/1972 | Bram | 403/368 X |
| 4,514,109 | 4/1985 | McKenna | 403/370 |
| 5,496,126 | 3/1996 | Lin | 403/370 |

FOREIGN PATENT DOCUMENTS

| | | | |
|---|---|---|---|
| 1022798 | 12/1952 | France | 403/370 |
| 85522 | 3/1990 | Japan | 403/370 |

*Primary Examiner*—Harry C. Kim
*Attorney, Agent, or Firm*—Pro-Techtor International Services

[57] ABSTRACT

A hidden screw-pressing structure for a pipe connector being comprised of a plurality of "C" shaped engaging members, springs and rotation covers on a plurality of opened ends of the pipe connector; wherein, the opened ends each is formed to have a diameter-reducing wall, the external wall of each engaging member is formed to have the same tapering surface as that of the diameter-reducing wall, an inner screw-pressing wall of the engaging member is formed a straight pipe wall, one of the springs abuts on the top of the engaging member and is subjected to compression of one of the rotation covers, screwing in of the rotation cover compresses the spring to push the engaging member inwardly, the inner screw-pressing wall of the engaging member thereby is given with a function for reducing diameter, in this way the walls of the pipes to be connected are bound by the inner screw-pressing walls, therefore, the pipes to be connected are bound in a hidden mode in the pipe connector without damaging the pipes themselves.

1 Claim, 4 Drawing Sheets ing the detailed description of the preferred embodiment

HIDDEN SCREW-PRESSING STRUCTURE FOR A PIPE CONNECTOR

BACKGROUND OF THE INVENTION

1. Field of the Invention

The present invention is related to a hidden screw-pressing structure for a pipe connector, and especially to a screw-pressing structure wherein a cover compresses a spring when in screwing in for tightening, so that the spring pushes a "C" shaped engaging member to render it to abut at an end of the connector against a diameter-reducing wall, so that the inner wall of the "C" shaped engaging member creates diameter reducing function and thus screw-pressing the external wall of a pipe to be connected.

2. Description of the Prior Art

Pipe connectors have been widely used in the cases requiring connection of pipes in the markets, for example, of those pipes made of metal, such as plumbing pipes, electric wire pipes, pipes for exhibition shelves and pipes for bicycle frames etc., the connectors and the pipes to be connected do not have to be undetatchably welded or locked for the sake of convenience of detatching for maintenance, therefore, movable locking modes are adapted and are widely used in the art.

However, people who assemble pipe connectors with pipes in a movable locking mode mostly use the pipe connectors having internal screw threads and the pipes to be connected having external screw threads, so that the internal and external screw threads can be mutually engaged, the defect of this mode is that the external screw threads tend to be exposed and make a trouble of ugliness, and they are subjected to wetting and rusting and blocking thereby, particularly in those cases requiring high quality as well as as good appearance, manufacturers hate to see such defect.

And more, such pipe connectors and pipes assembled with internal screw threads and external screw threads must be connected or disconnected by using wrenches, and these wrenches must be those having fitted engaging heads for locking and unlocking just like a polygonal nut; however, requirement of wrenches for locking and unlocking has already been countrary to the principle of simpliness and easiness, and to form a polygonal nut shape for the appearance of the pipe connectors and pipes for locking and unlocking is a measure against requirement of good appearance of the consumers in the markets.

SUMMARY OF THE INVENTION

Therefore, the primary object of the present invention is to provide a screw-pressing structure for a pipe connector meeting the requirement of competition in the markets under consideration for simultaneously obtaining tight locking function, easy detachment capability and good looking in appearance.

To achieve the object, the present invention shall be provided with the following characteristics:

1. A spring and a "C" shaped engaging member are used to create diameter reducing function and thus bind the external wall of a pipe to be connected with the surrouding surface of the "C" shaped engaging member, thereby, an effect of surrounding strong screw-pressing can be obtained.

2. The spring having vibration absorption capability after being compressed endues a pipe connector and a pipe to be connected with stability for anti-loosening after being bound.

3. The spring can store the compression force exerted directly by a rotation cover in locking, this facilitates locking and detachment of the cover in an easy and convenient way without aid of other tools.

4. The principal screw-pressing members are hidden, and only the exposed cover is provided with decoration and skipproof decorative veins, this increases apparent beauty thereof.

The present invention will be further apparent after reading the detailed description of the preferred embodiment thereof in reference to the accompanying drawings. Wherein:

DETAILED DESCRIPTION OF THE PREFERRED EMBODIMENT

Figure 1:
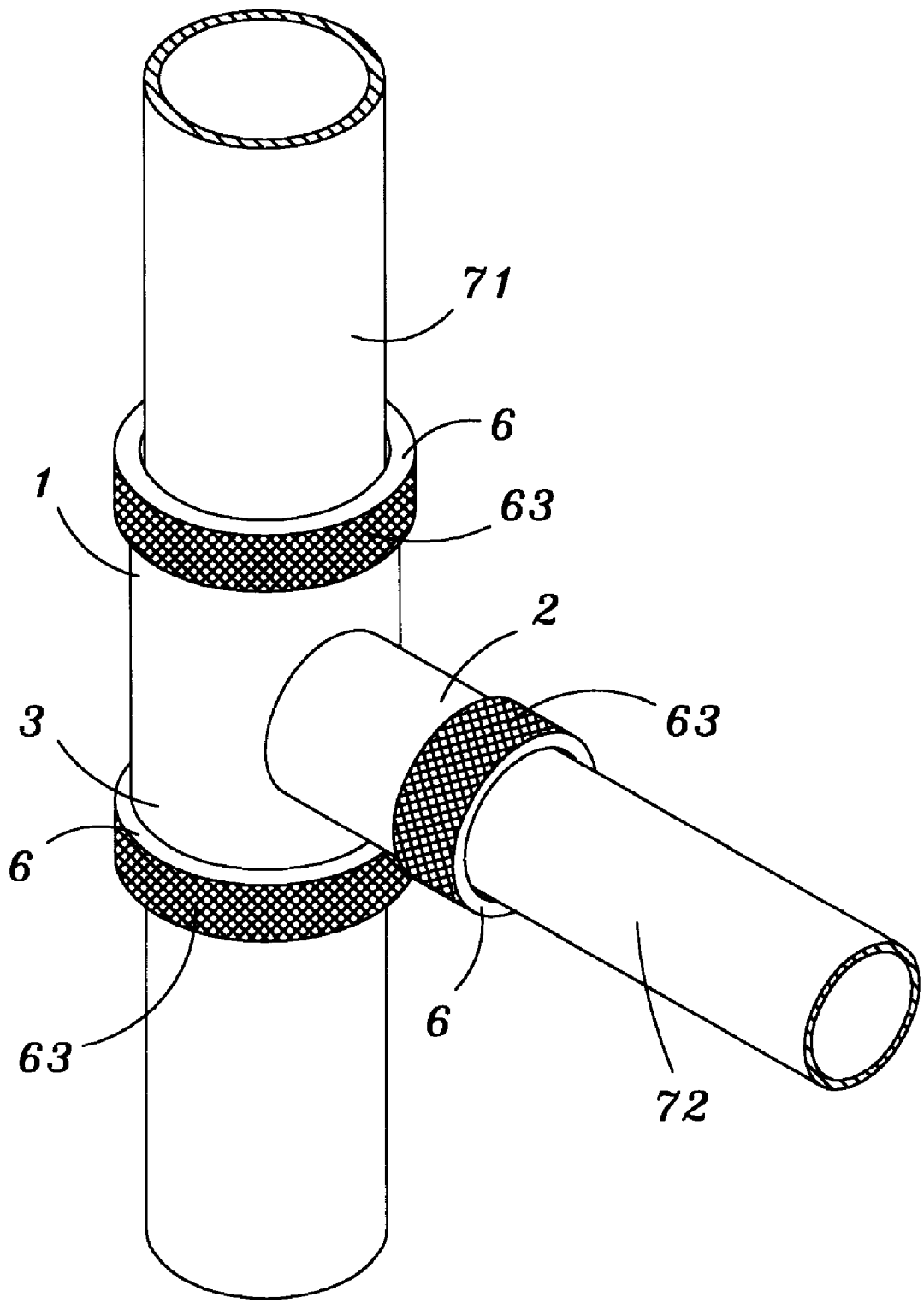
FIG. 1 is a perspective view of the present invention.
Figure 2:
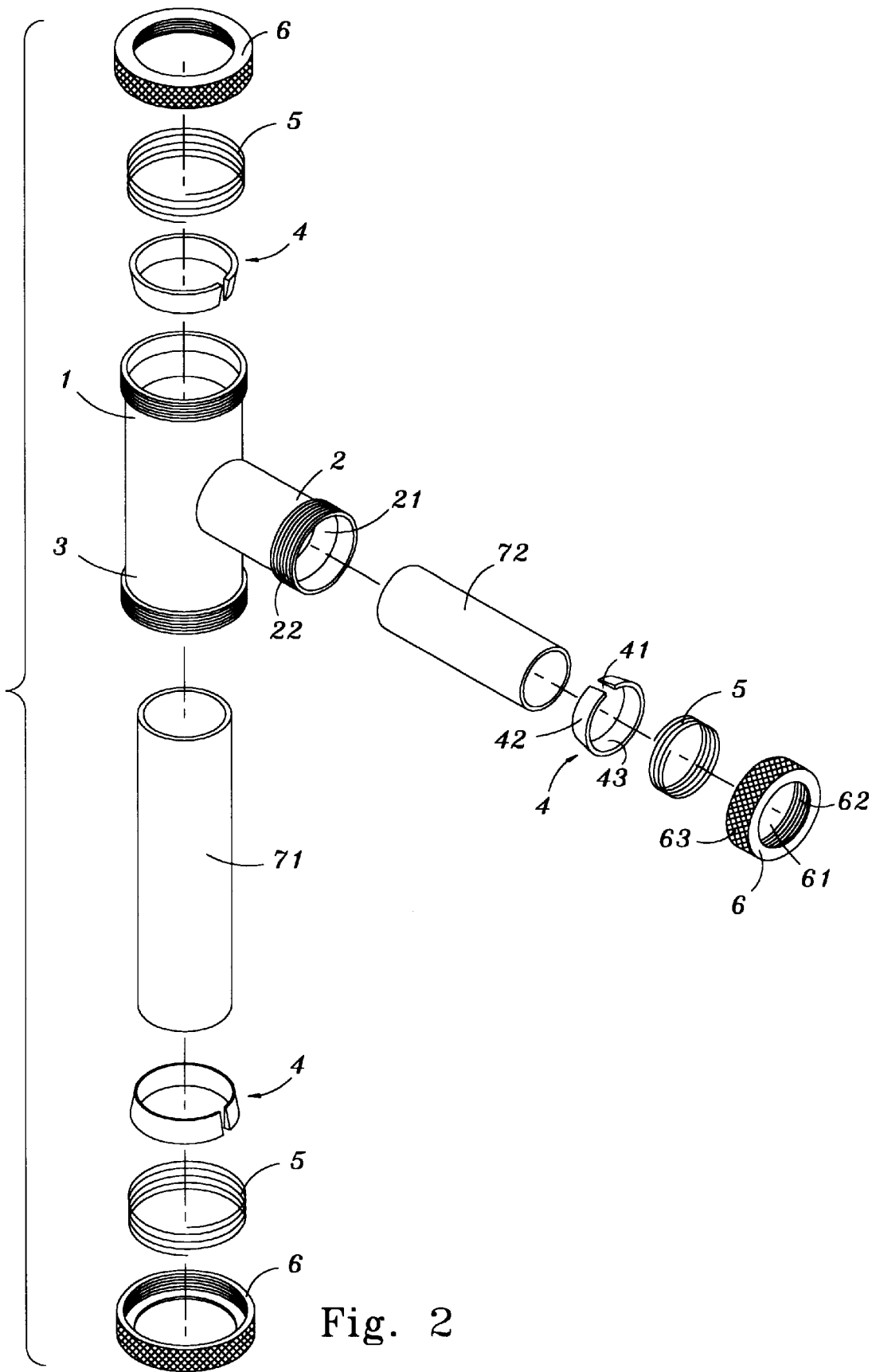
FIG. 2 is an analytic perspective view of the present invention.

Referring to FIGS. 1 and 2, the present invention takes a pipe connector with three opened ends 1, 2 and 3 as a preferred embodiment of the hidden binding structure thereof. The field for putting in practice of the screw-pressing structure of the present invention is not limited to the case that a pipe connector is provided with three opened ends 1, 2 and 3, practically, the pipe connector can be provided with only one or with more than one opened ends in any axial direction.

As shown in FIG. 2, the hidden screw-pressing structure of the present invention includes a "C" shaped engaging member 4, a spring 5 and a rotation cover 6, wherein:

The three opened ends 1, 2 and 3 (taking the opened end 2 as a representative example) each is formed to have a diameter-reducing wall 21, the mouth of the opened end 2 is formed to have an external thread 22; the engaging member 4 which is in the shape of "C" leaves a gap 41 to afford diameter reducing, the external wall 42 of the engaging member 4 is formed to have the same tapering surface as that of the diameter-reducing wall 21, while the inner wall 43 of the engaging member 4 is formed straight; the screw type spring 5 is used as a compression spring; the rotation cover 6 is provided at the center thereof with a hole for exposing of a pipe to be connected, and the inner wall of the rotation cover 6 is provided with an internal thread 62, while the external wall thereof is formed to have decoration and skip-proof decorative veins 63; a screw-pressing structure of the present invention thus is completed.

Figure 3:
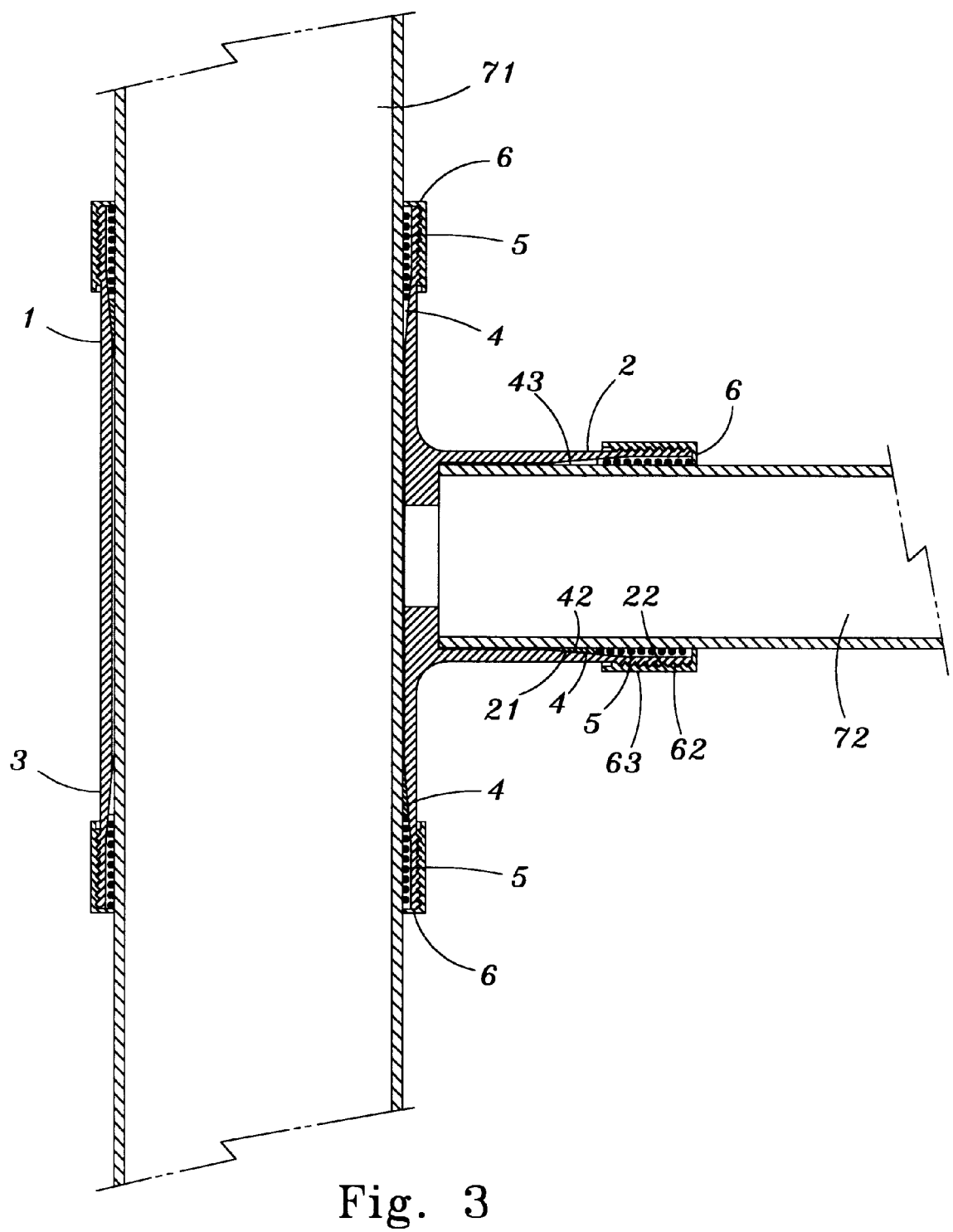
FIG. 3 is a sectional view of the present invention.
Figure 4:
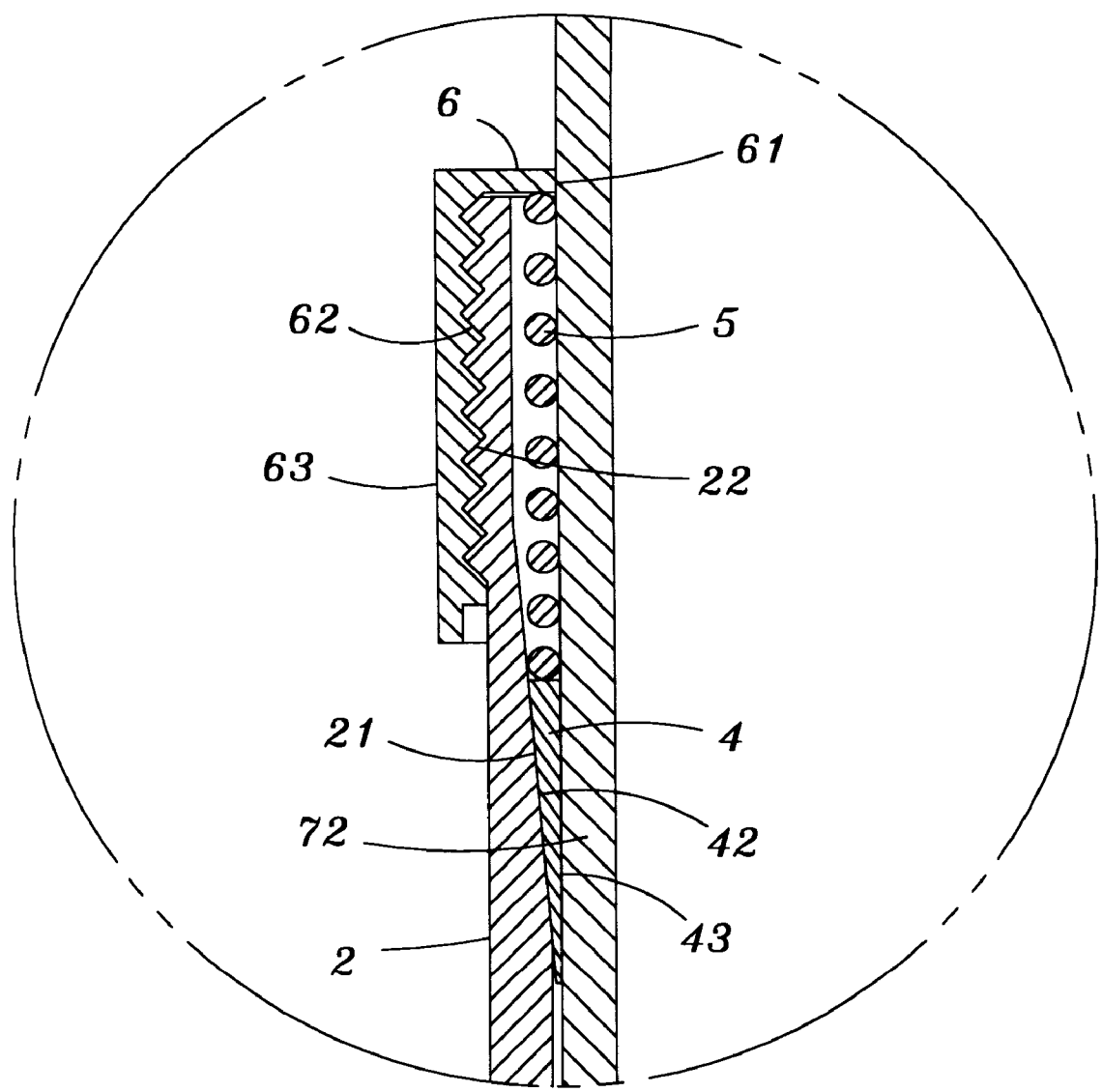
FIG. 4 is an enlarged sectional view of the screw-pressing structure of the present invention.

When in assembling (referring to FIGS. 2 and 3), the engaging member 4 is in the first place put in the opened end 2 (representative of the three opened ends 1, 2 and 3), the external wall 42 thereof contacts the diameter-reducing wall 21, then the spring 5 is put in and abuts on the top of the engaging member 4, thereafter, the rotation cover 6 is screwed onto the external thread 22 of the opened end 2 with its internal thread 62 and gradually screwed tight to compress the spring 5, a main pipe 71 to be connected is extended in between the opened ends 1 and 3 in the vertical direction in the drawings before the rotation cover 6 is completely screwed tight, a transverse pipe 72 to be connected is extended in the opened end 2, then the rotation cover 6 is kept on to be screwed tight until it is locked tight to the end of the external thread 22 which is then completely hidden by the rotation cover 6 (referring to FIG. 4), the spring 5 is stored with compression force during continuous compressing by the rotation cover 6, it is capable of pushing the engaging member 4 inwardly, the external wall 42 of the engaging member 4 now is subjected to screw-pressing function from the surrounding diameter-reducing wall 21, an inner screw-pressing wall 43 of the engaging member 4 thereby is given with function for reducing diameter, so that the wall of the pipe 72 (71 likely) to be connected is bound by the inner screw-pressing wall 43 of the engaging member 4; therefore, the pipes 71, 72 to be connected are stably bound by the pipe connector without damaging the pipes 71, 72 themselves, an effect of anti-loosening and enduing withgood looking can be obtained, and the present invention is highly valuable in the industry.

Having thus described my invention, what I claim as new and desire to be secured by Letters Patent of the United States is:

1. A hidden connecting structure for a pipe connector adapted to connect a plurality of pipes comprising:

pipe connector body with a plurality of externally threaded open ends, and a plurality of "C" shaped engaging members, each of said engaging members being associated with a spring and an internally threaded rotation cover; wherein, each said rotation cover is adapted to receive one of the pipes in a central opening in said rotation cover, each said rotation cover is screwed onto a corresponding one of said open ends, said rotation cover being in contact with a corresponding one of said springs, said rotation cover being gradually tightened to compress said corresponding one of said springs which in turn is in contact with and applies pressure to a corresponding one of said engaging members, said corresponding one of said engaging members thereby securing one of the pipes to be connected in said open ends in a manner such that said external threads, said springs and said engaging members are hidden by said rotation covers when said hidden connecting structure is in use; and wherein each of said open ends includes a tapered diameter-reducing interior wall, and an external wall of each of said engaging members each is formed to have a profile matching that of said diameter-reducing interior wall, and an interior wall of said engaging member has a smooth surface with a constant diameter so as to receive one of the pipes therein with maximum contact area, such that when said engaging member is placed into one of said open ends, said external wall of said engaging member contacts said diameter-reducing interior wall of said open end so that a uniform pressure is applied to an end of the pipe.

* * * * *